United States Patent [19]
Itoh

[11] Patent Number: 5,878,319
[45] Date of Patent: Mar. 2, 1999

[54] IMAGE SCANNER HAVING A SINGLE CONTACT GLASS AND CONTACT-TYPE IMAGE SENSOR MOVABLE UNDER AUTOMATIC DOCUMENT FEEDER

[75] Inventor: Yoshiya Itoh, Atsugi, Japan

[73] Assignee: Ricoh Company, Ltd., Tokyo, Japan

[21] Appl. No.: 905,392

[22] Filed: Aug. 4, 1997

[30] Foreign Application Priority Data

Aug. 6, 1996 [JP] Japan .................................. 8-206698

[51] Int. Cl.⁶ .................................................. G03G 15/00
[52] U.S. Cl. ........................... 399/367; 358/496; 399/215
[58] Field of Search .................................. 399/367, 371, 399/215; 271/3.01; 358/474, 496, 498

[56] References Cited

U.S. PATENT DOCUMENTS

| | | | |
|---|---|---|---|
| 5,064,182 | 11/1991 | Tokutsu | 399/371 X |
| 5,077,585 | 12/1991 | Watanabe et al. | 399/367 |
| 5,610,731 | 3/1997 | Itoh . | |
| 5,734,483 | 3/1998 | Itoh | 358/496 |

FOREIGN PATENT DOCUMENTS 4-369162  12/1992  Japan .

*Primary Examiner*—S. Lee
*Attorney, Agent, or Firm*—Oblon, Spivak, McClelland, Maier, & Neustadt, P.C.

[57] ABSTRACT

An image scanner includes a single contact glass placed on a main body. The contact glass has a first range through which a first original document is passed to be scanned, and a second range over which a second original document is placed to be scanned. An image sensor scans the first original document at a fixed position in the first range, and the image sensor scans the second original document while the image sensor moves through the second range. An automatic document feeder is arranged on the first range of the contact glass to introduce the first original document through an introducing path to the fixed position and to eject the first original document through an ejecting path from the fixed position. The introducing path is formed from an introducing orifice to the fixed position, the introducing orifice being located at a side of the second range of the automatic document feeder. Further, an ejecting path is formed from the fixed position to an ejecting orifice.

18 Claims, 6 Drawing Sheets

IMAGE SCANNER HAVING A SINGLE CONTACT GLASS AND CONTACT-TYPE IMAGE SENSOR MOVABLE UNDER AUTOMATIC DOCUMENT FEEDER

BACKGROUND OF THE INVENTION

1. Field of the Invention

The present invention generally relates to an image scanning apparatus used in an image forming apparatus such as a copy machine, a facsimile machine, etc., and more particularly to an image scanning apparatus having a contact-type image sensor to scan an original image.

2. Description of the Background Art

A CCD image sensor or a contact-type image sensor is commonly used in an image scanner.

In an image scanner applicable for scanning a book document as an original document which has a fixed position on a contact glass, a thickness of the image scanner can be reduced by using a contact-type image sensor rather than a CCD image sensor. Additionally, usage of the contact-type image sensor has advantages that a driving system thereof is greatly simplified such that many adjustments are not needed, and a distortion of an image is reduced due to an optical reduction system.

However, although the contact-type image sensor has the above-mentioned advantages, there is a problem in that a constant position of a focal point is not obtained over an entire scanning area unless a supporting construction of the image sensor has a high accuracy and rigidity.

An image scanner may also include an automatic document feeder (ADF), which feeds documents one by one. Each document fed into the ADF is conveyed to a scanning point at which point the document is scanned by an image reading apparatus, and then the document is conveyed to an outside of the ADF.

As an example, a background device of FIG. 1, which is disclosed in Japanese Laid-Open Patent Application No. 4-369162, discloses an image scanner having a contact-type image sensor and two contact glasses 1A, 1B. One contact glass 1B is placed at a bottom to one side on a main body, and another contact glass 1A is placed at another side of the main body. In this case, each contact glass 1A, 1B is placed separately so that there is a problem that a bump and nip exist between the two contact glasses 1A and 1B, or between the contact glasses 1A, 1B and a supporting member for supporting the contact glasses 1A, 1B. As a result, there is a difficulty of manufacturing such a device with accuracy and rigidity, and a supporting construction may be scratched by the bump and nip and thereby cannot function normally as a spacer.

A background device of FIG. 2, which is also disclosed in Japanese Laid-Open Patent Application No. 4-369162, discloses an image scanner having a contact-type image sensor and a single contact glass 1C. The image scanner has a guide member 100 about a scanning point inside the ADF which guides an original document that is scanned smoothly by an image sensor for an outlet of the ADF. Moreover, a part of the guide member 100 is imbedded in the contact glass 1C. By requiring this guide member 100 to be imbedded in the contact glass 1C, manufacturing processes are increased, and thereby a cost increases. Further, in this device the ejecting path is formed in a U-shape and the guiding member 100 guides an original document scanned in a slanting direction upward, and as a result it is possible that the original document may be caught in the ejecting path.

A background device of FIG. 3, which is also disclosed in Japanese Laid-Open Patent Application No. 4-369162, discloses an image scanner having a contact-type image sensor and a single contact glass 1. Moreover the image scanner has a transparency board 200 on a contact glass 1 and successively a film (e.g. mylar) 201 and a guide member 202. These elements operate to guide a document scanned by an image sensor smoothly for an outlet of the ADF. However, in this device of FIG. 3 the transparency board 200 needs to be set on the contact glass 1 exactly and the film 201 needs to be set downstream of the transparency board 200 exactly. On this account, a component count number and a structure manufacturing process number are increased, and thereby a cost increases. Furthermore, despite establishing the guiding member 202, the transparency board 200 and the film 201, a paper jam may occur, because the ejecting path is in a U-shape and the guiding member 202, the transparency board 200 and the film 201 guides an original document scanned in a slanting direction upward, so that the original document may be caught in the ejecting path.

SUMMARY OF THE INVENTION

It is a general object of the present invention to provide a novel image scanner having a contact-type image sensor, a single contact glass, and automatic document feeder in which the above-mentioned disadvantages are eliminated.

Another object of the present invention is to provide a novel image scanner having a contact-type image sensor, a single contact glass, and an automatic document feeder, and in which image scanner the original document is fed through into the ADF, and is scanned and ejected outside of the ADF smoothly.

Still another object of the present invention is to provide a novel image scanner having a contact-type image sensor, a single contact glass, and an automatic document feeder, and in which image scanner an ejecting path is structured simply.

In order to achieve the above-mentioned objects, there is provided according to one aspect of the present invention an image scanner including a single contact glass placed on a main body. The contact glass has a first range in which a first original document is passed through and scanned, and a second range in which a second original document is mounted and scanned. An image sensor is arranged under the contact glass and scans the first original document at a fixed position under the first range. The image sensor scans the second original document while moving under the second range. An automatic document feeder is arranged on the first range of the contact glass and feeds the first original document through an introduction path to a point corresponding to the fixed position The automatic document feeder ejects the first original document through an ejecting path from the point corresponding to the fixed position to outside of the automatic document feeder. The introduction path is provided in the automatic document feeder and is formed from an introducing orifice to the point corresponding to the fixed position. The introducing orifice is located near a side of the second range of the automatic document feeder. The ejecting path is formed from the point corresponding to the fixed position to an ejecting orifice and is formed in a same conveying direction as the introduction path, e.g., in a horizontal and/or straight direction.

The above and other objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
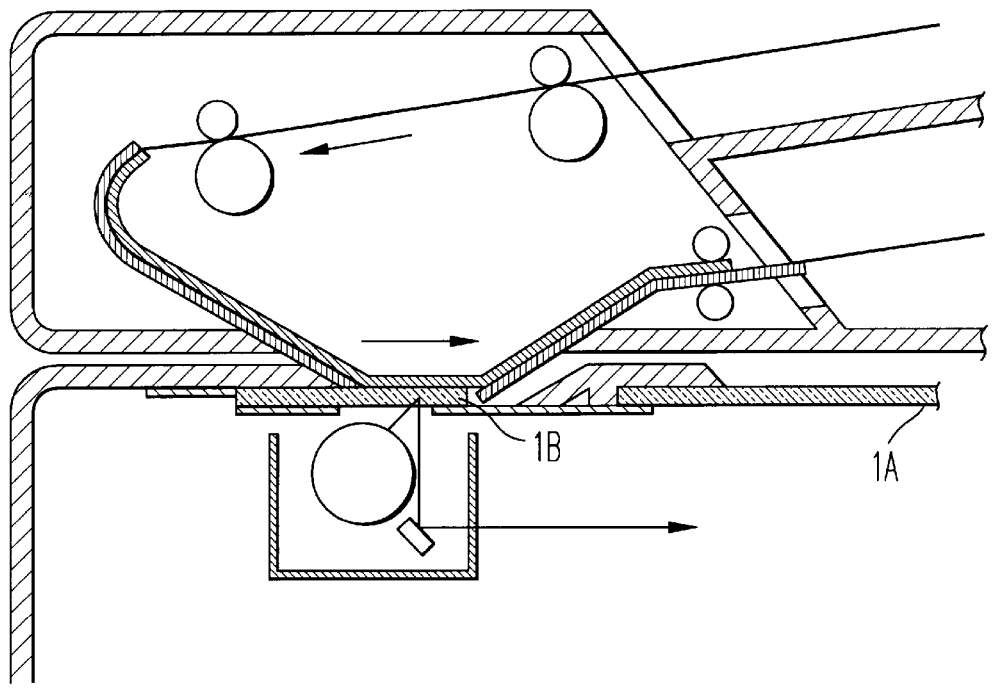
FIG. 1 shows a first background device image scanner.
Figure 2:
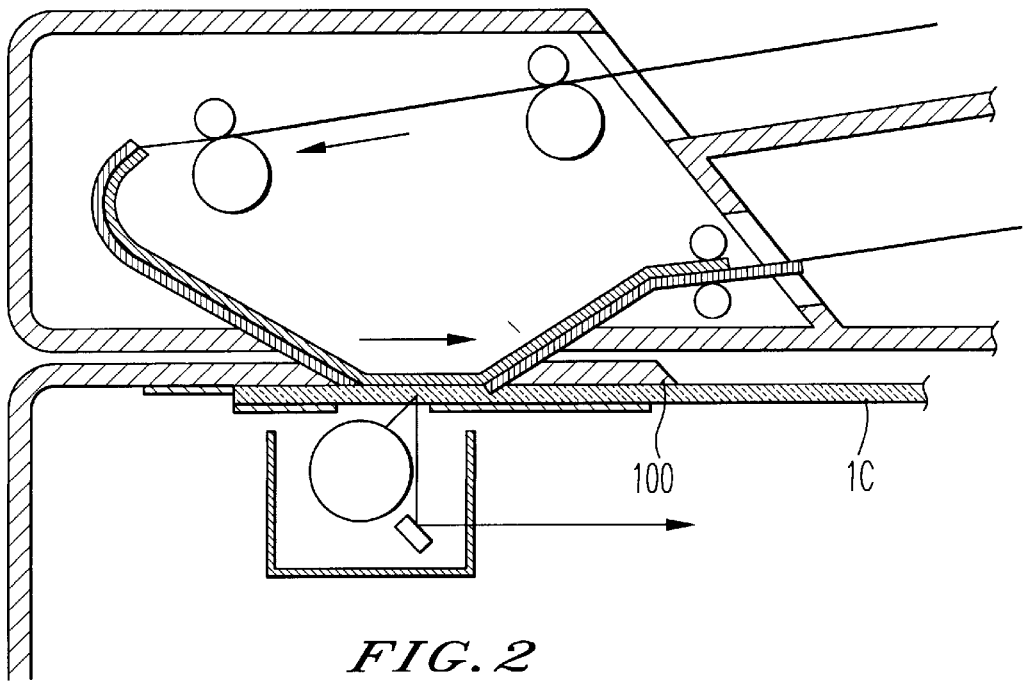
FIG. 2 shows a second background device image scanner.
Figure 3:
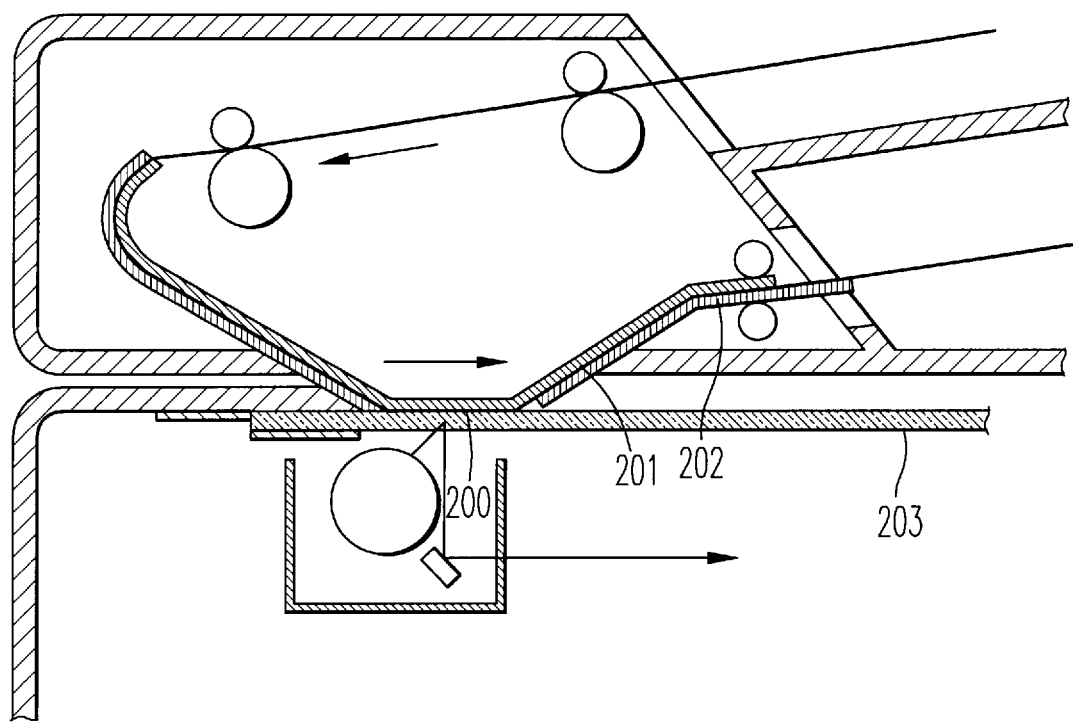
FIG. 3 shows a third background device image scanner.
Figure 4:
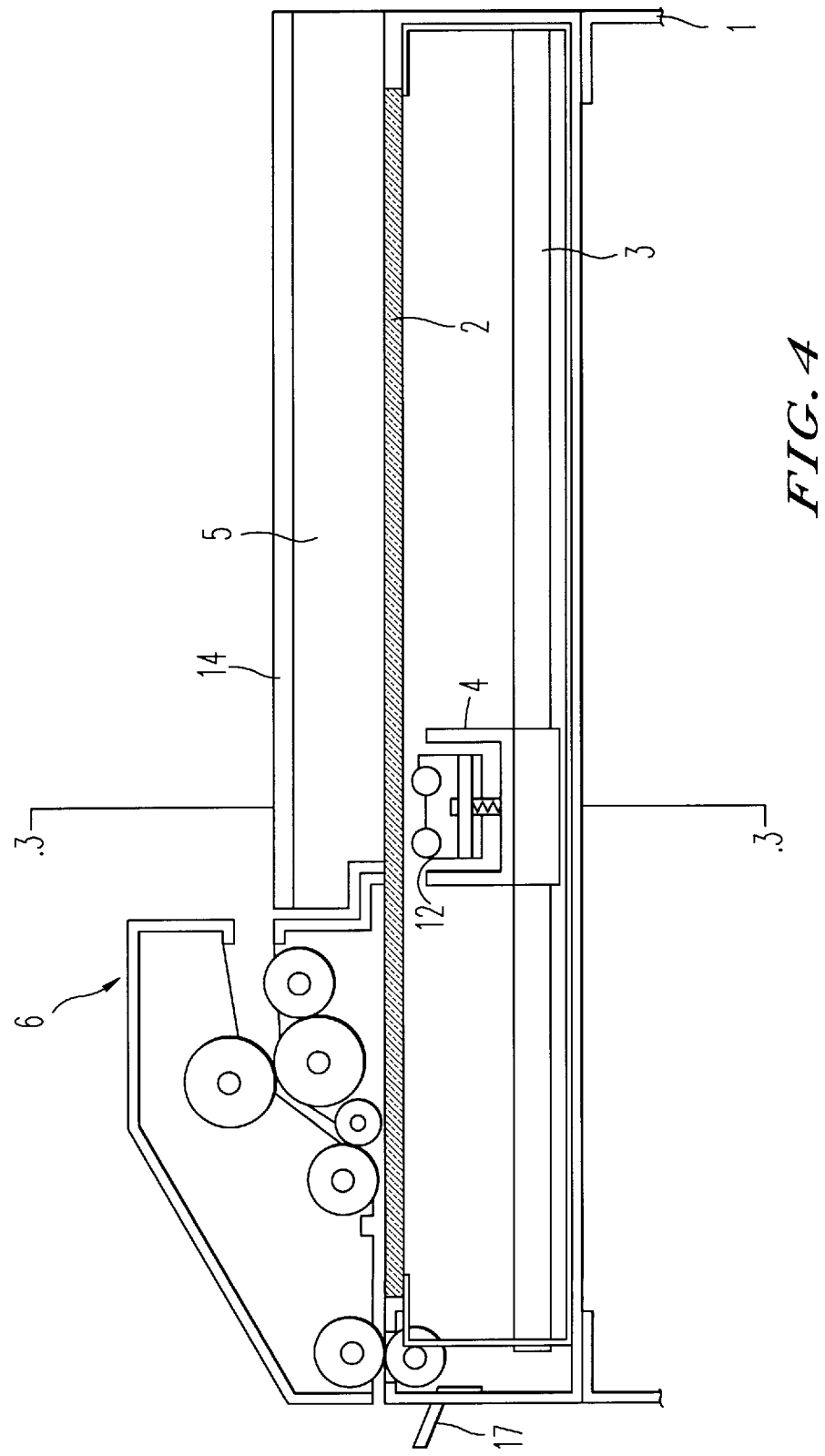
FIG. 4 is a cross-sectional view of an embodiment of an image scanner according to the present invention.
Figure 5:
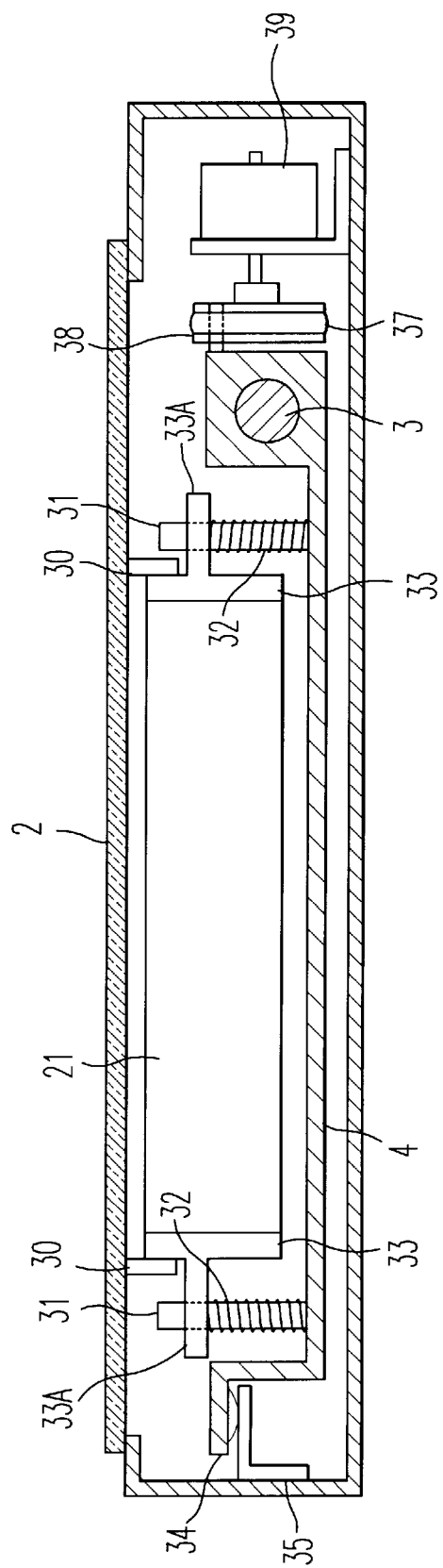
FIG. 5 is a cross-sectional view taken along a line III—-III in FIG. 4.

A description will now be given of a first embodiment of an image scanner according to the present invention. FIG. 4 is a cross-section view of an embodiment of the image scanner according to the present invention. FIG. 5 is a cross-section view taken along a line III—III in FIG. 4.

In FIGS. 4 and 5, an embodiment of an image scanner according to the present invention includes a main body 1, a contact glass 2, an automatic document feeder (ADF) 6, a carriage 4 having a contact-type image sensor 21 and a guide shaft 3. The contact glass 2 is fixed on a top of the main body 1, and an original document to be scanned is placed thereon. The ADF 6 is positioned on a top of both the main body 1 and the contact glass 2. The carriage 4 on which the contact-type image sensor 21 is mounted is moved in an area positioned under the contact glass 2. The movement of the carriage 4 is guided by the guide shaft 3 provided in the main body 1.

The carriage 4 is supported, as shown in FIG. 5, by the guide shaft 3 on one side thereof, and a sliding protrusion 34 is formed on another side of carriage 4. The sliding protrusion 34 slides on a rail member 35 formed on the main body 1. The carriage 4 is driven by a wire 37. Opposite ends of the wire 37 are connected to the carriage 4. The wire 37 is half wound on a pulley 38, and a reversible motor 39 rotates the pulley 38. Accordingly, the carriage 4 can be reciprocally moved by driving forces generated by the reversible motor 39 and transmitted to the pulley 38 and the wire 37.

The contact-type image sensor 21 moves under the contact glass 2 so as to scan an image of an original document placed on a range of the contact glass 2. Furthermore, The contact-type image sensor 21 moves to a position under the contact glass 2 so as to scan an image of an original document fed to a range of the contact glass through the ADF 6. Rollers 30, which act as spacers, are rotatably supported on an upper portion of the image sensor 21. Additionally, side wings 33 are mounted on each of side surfaces of the image sensor 21, which side surfaces are parallel to an axis of the guide shaft 3, and a wing portion 33a of the side wing has a through hole into which a shaft 31 is protrusively provided on the carriage 4 and is inserted.

A spring 32 is fit on the shaft 31 between the carriage 4 and the wing portion 33a of the side wings 33 so that the spring 32 presses the image sensor 21 toward a bottom surface of the contact glass 2.

Figure 6:
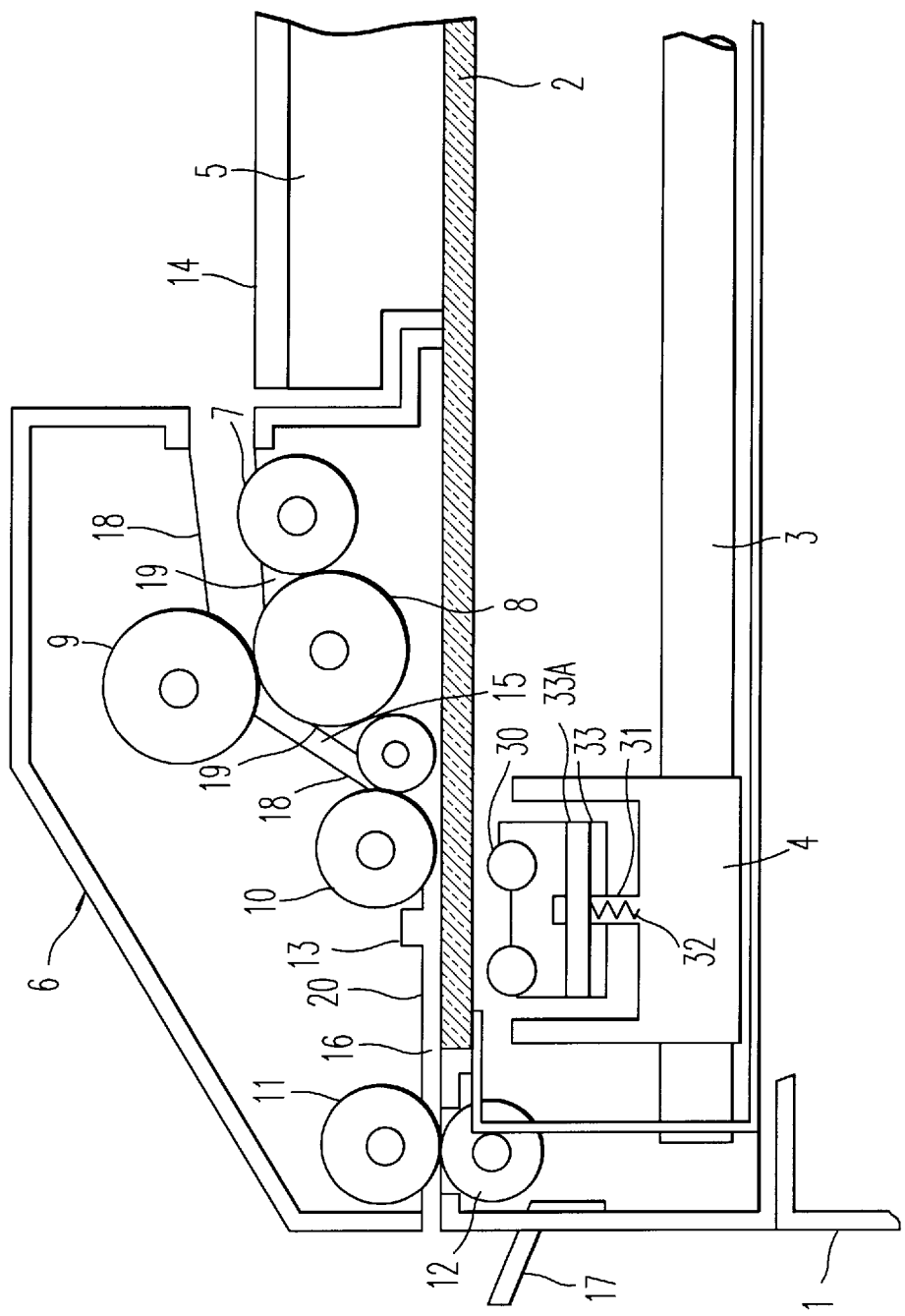
FIG. 6 is a cross-sectional view of a part of an ADF in FIG. 4.

FIG. 6 is a cross-sectional view of a part of the ADF 6 in FIG. 4.

In FIG. 6, The ADF 6 is a single unit including a pick-up roller 7, a feeding roller 8, a separating roller 9, a plurality of conveying rollers 10, an introducing path 15, an upper ejecting roller 11, a part of an ejecting path 16, and a white board 13 for shading correction. The pick-up roller 7 feeds original documents piled on a supplying tray 14 one by one. The supplying tray 14 is integral with a pressing board 5 which is openable into the ADF 6.

The introducing path 15 includes an upper introducing plate 18 and a lower introducing plate 19 and is formed between an inlet of the ADF 6 and a scanning area where the original document fed through is scanned.

The ejecting path 16 includes an upper ejecting plate 20, an upper ejecting roller 11 arranged at halfway thereof, a part of an upper surface of the main body 1, in which a lower ejecting roller 12 is arranged in opposition to the upper ejecting roller 11, and an edge of the contact glass 2 is placed next to the upper ejecting roller 11 and the lower ejecting roller 12. The ejecting path 16 is formed between the scanning area and an outlet of the ADF 6.

The ejecting path 16 can be formed to be horizontal and straight in a same feeding direction as the introducing path 15 in a horizontal line. That is, in the present invention the ejecting path 16 is not U-shaped but is substantially straight, and thus paper sheets smoothly move through the ejecting path 16 in the present invention.

The upper ejecting roller 11 is rotated by a motor (not shown) having a one-way clutch so that the upper ejecting roller 11 is rotatable manually, when the upper ejecting roller 11 is not rotated by the motor The lower ejecting roller 12 is pressed by an elastic member (not shown) toward the upper ejecting roller 11.

In the above-mentioned construction, when an original document of a book-type or a static type is scanned, first of all, an original document is placed on the contact glass 2 so as to be scanned, and then the original document is pressed and covered by the pressing board 5. After a starting button in an operation board (not shown) is pushed, the carriage 4 moves under the contact glass 2 through a range of the contact glass 2 by being pulled by the wire 37 while a distance between the image sensor 21 and the bottom surface of the contact glass 2 is maintained to be constant as the image sensor 21 is pressed against the contact glass 2 via the rollers 30 interposed therebetween.

Scanning of the original document is performed while the carriage 4 is moving at a range corresponding to a size of the original document.

When an original document of a moving-type is scanned, first of all, an original document is placed, or plural original documents are piled, on the supplying tray 14, so as to be scanned. After a starting button in the operation board is pushed, the carriage 4 moves and stands by at the scanning position, as shown in FIG. 6, to scan the document fed through the ADF 6. At the same time, an original document placed or piled on the supplying tray 14 is picked-up by the pick-up roller 7, and is fed through the introducing path 15 by the feeding roller 8 and the separating roller 9 one by one to the scanning position in a range of the contract glass 2. The original document is scanned at the instant of passing through the scanning position between the contact glass 2 and the white board 13 by the contact-type image sensor 21. Afterward, the original document is fed through the ejecting path 16 by the upper ejecting roller 11 and the lower ejecting roller 12, and is then discharged from out of the ADF 6 to the ejecting tray 17 mounted to the main body 1.

In the above construction, the ejecting path 16, in an upper part, is formed of a part of the ADF 6, and in a lower part, the ejecting path 16 is formed of a part of the contact glass 2 and a part of the main body 1. In this way, the ejecting path 16 is formed flat, horizontally and/or straight so that the original document is fed smoothly without being caught by an uneven spot on the ejecting path 16 and without passing through a U-shaped path. Consequently, the guide member or the transparency board above mentioned need not be established in an automatic document feeder.

Furthermore, as a construction of an image scanner becomes simple with the construction in the present invention, the cost of the image scanner is kept low.

Furthermore, the contact glass 2 is placed close to the lower ejecting roller 12 apart from the scanning position. Therefore, when an edge of the original document is fed at the boundary between the contact glass 2 and the main body 1, a state of the original document is horizontal and straight enough to be fed smoothly.

Figure 7:
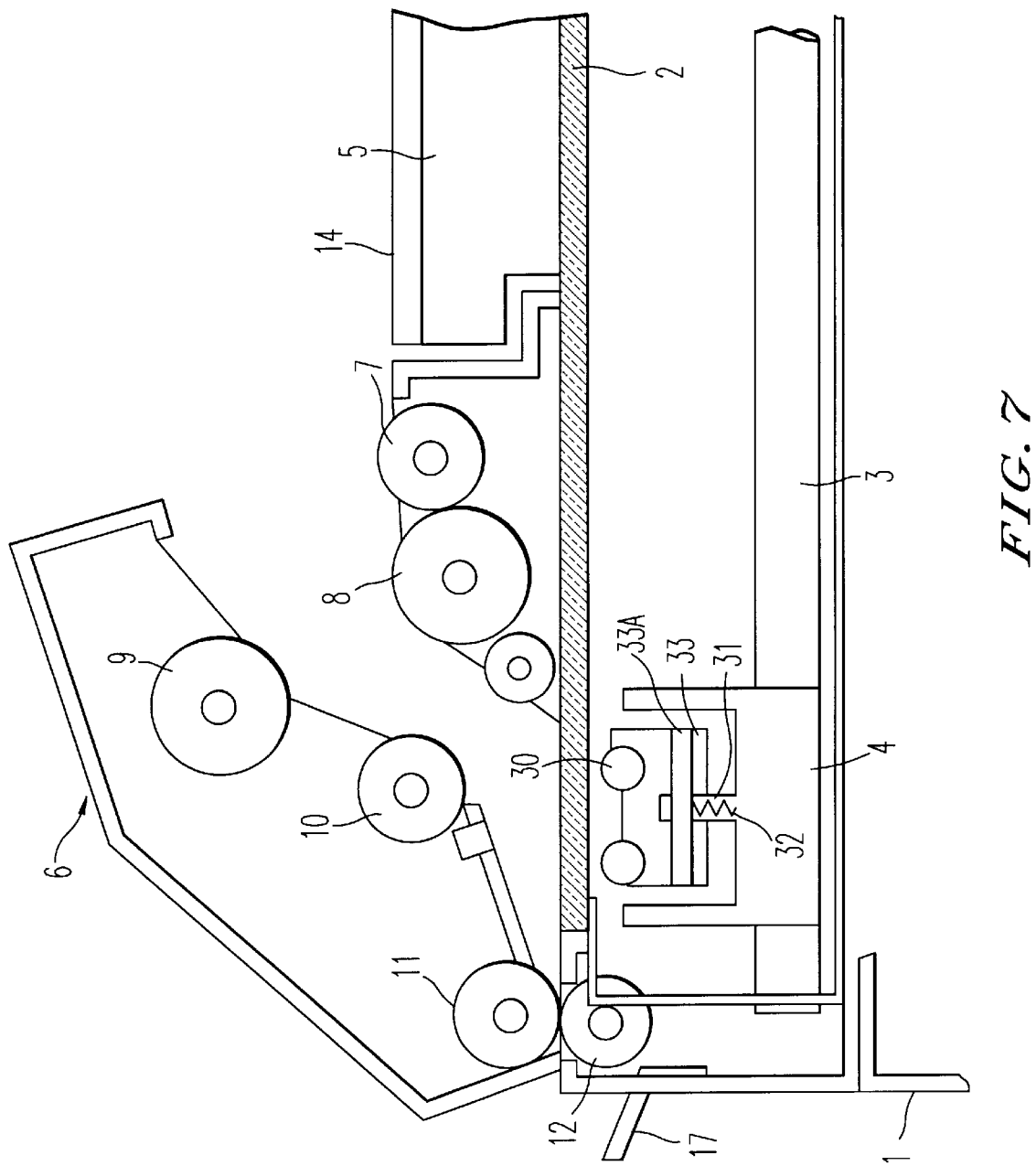
FIG. 7 is a cross-sectional view of an opening state of the ADF.

FIG. 7 shows an opening state of the ADF. An upper part of the ADF 6 is rotatable and openable, as shown in FIG. 7, with an axis of the upper ejecting roller 11 as a central axis.

When an original document is jammed in the introducing path 15 or the ejecting path 16, an upper part of the ADF 6 is opened, and then spaces of the introducing path 15 and the ejecting path 16 spread out and are accessible. In this open state as shown in FIG. 7, a jammed original document can be striped away easily.

The original document can be pulled out from the feeding direction manually, when the original document is jammed and caught between the upper ejecting roller 11 and the lower ejecting roller 12, and when the upper ejecting roller 11 is not rotated by the motor, and it is for this reason that the upper ejecting roller 11 has a one way clutch.

In this embodiment, the axis of the upper ejecting roller 11 is adopted for the central axis of rotating of the ADF 6 in order to keep cost low. However, when a central axis is established on a right side compared with the axis of upper ejecting roller 11, power may be necessary for opening the upper part of the ADF 6. In this case of opening the ADF 6, the upper ejecting roller 11 is pushed down toward the lower ejecting roller 12, and consequently the lower ejecting roller 12 moves downward opposing to the elasticity of the elastic member without being damaged.

Obviously, numerous additional modifications and variations of the present invention are possible in light of the above teachings. It is therefore to be understood that within the scope of the appended claims, the present invention may be practice otherwise than as specifically described herein.

The present invention is based on Japanese Priority Document 8-206698, the contents of which are incorporated herein by reference.

What is claimed as new and desired to be secured by Letters Patent of the United States is:

1. An image scanner comprising:
   a single contact glass placed on a main body, said contact glass having a first range through which a first original document is passed to be scanned, and a second range over which a second original document is placed to be scanned;
   an image sensor scanning said first original document at a fixed position in the first range, and said image sensor scanning said second original document while the image sensor moves through the second range;
   an automatic document feeder arranged on the first range of the contact glass, the automatic document feeder introducing said first original document through an introducing path to said fixed position and ejecting said first original document through an ejecting path from said fixed position;
   wherein the introducing path is formed from an introducing orifice to said fixed position, the introducing orifice being located at a side of the second range of the contact glass; and
   wherein the ejecting path is formed from said fixed position to an ejecting orifice, and wherein the ejecting path includes an upper side and a lower side, wherein said upper side includes a part of the automatic document feeder and said lower side includes a part of the contact glass.

2. The image scanner as claimed in claim 1, wherein said ejecting path is straight.

3. The image scanner as claimed in claim 1, wherein said ejecting path is horizontal.

4. An image scanner, comprising:
   a single contact glass placed on a main body, said contact glass having a first range through which a first original document is passed to be scanned, and a second range over which a second original document is placed to be scanned;
   an image sensor scanning said first original document at a fixed position in the first range, and said image sensor scanning said second original document while the image sensor moves through the second range;
   an automatic document feeder arranged on the first range of the contact glass, the automatic document feeder introducing said first original document through an introducing path to said fixed position and ejecting said first original document through an ejecting path from said fixed position;
   wherein the introducing path is formed from an introducing orifice to said fixed position, the introducing orifice being located at a side of the second range of the contact glass; and
   wherein the ejecting path is formed in a same conveying direction as the introducing path.

5. The image scanner as claimed in claim 4, wherein said ejecting path is straight.

6. An image scanner comprising:
   a single contact glass placed on a main body, said contact glass having a first range through which a first original document is passed to be scanned, and a second range over which a second original document is placed to be scanned;
   an image sensor scanning said first original document at a fixed position in the first range, and said image sensor scanning said second original document while the image sensor moves through the second image;
   an automatic document feeder arranged on the first range of the contact glass, the automatic document feeder introducing said first original document through an introducing path to said fixed position and ejecting said first original document through an ejecting path from said fixed position; and
   wherein the ejecting path is formed from said fixed position to an ejecting orifice, and first and second rollers arranged in the ejecting path feeding the first original document to said ejection orifice, wherein the first roller is arranged in said automatic document feeder and the second roller is arranged in said main body;

wherein the introducing path is formed from an introducing orifice to said fixed position, the introducing orifice being located at a side of the second range of the contact glass.

7. The image scanner as claimed in claim 6, wherein an edge of said contact glass is adjacent to said first and second rollers.

8. The image scanner as claimed in claim 6, wherein said automatic document feeder is openable and is rotatable with an axis of said first roller as a central axis.

9. The image scanner as claim 6, wherein said first roller is driven by a driver including a one way clutch.

10. An image scanner comprising:

a contact means placed on a main body for contacting original documents, said contact means having a first range through which a first original document is passed to be scanned, and a second range over which a second original document is placed to be scanned;

sensor means for scanning said first original document at a fixed position in the first range, and said sensor means scanning said second original document while the sensor means moves through the second range;

automatic document feeder means arranged on the first range of the contact means for introducing said first original document through an introducing path to said fixed position and for ejecting said first original document through an ejecting path from said fixed position;

wherein the introducing path is formed from an introducing orifice to said fixed position, the introducing orifice being located at a side of the second range of the contact means; and wherein the ejecting path is formed from said fixed position to an ejecting orifice, and wherein the ejecting path includes an upper side and a lower side, wherein said upper side includes a part of the automatic document feeder means and said lower side includes a part of the contact means.

11. The image scanner as claimed in claim 10, wherein said ejecting path is straight.

12. The image scanner as claimed in claim 10, wherein said ejecting path is horizontal.

13. An image scanner, comprising:

a contact means placed on a main body for contacting original documents, said contact means having a first range through which a first original document is passed to be scanned, and a second range over which a second original document is placed to be scanned;

sensor means for scanning said first original document at a fixed position in the first range, and said sensor means scanning said second original document while the sensor means moves through the second range;

automatic document feeder means arranged on the first range of the contact means for introducing said first original document through an introducing path to said fixed position and for ejecting said first original document through an ejecting path from said fixed position;

wherein the introducing path is formed from an introducing orifice to said fixed position, the introducing orifice being located at a side of the second range of the contact means;

wherein the ejecting path is formed from said fixed position to an ejecting orifice; and wherein the ejecting path is formed in a same conveying direction as the introducing path.

14. The image scanner as claimed in claim 13, wherein said ejecting path is straight.

15. An image scanner comprising:

a contact means placed on a main body for contacting original documents, said contact means having a first range through which a first original document is passed to be scanned, and a second range over which a second original document is placed to be scanned;

sensor means for scanning said first original document at a fixed position in the first range, and said sensor means scanning said second original document while the sensor means moves through the second range;

automatic document feeder means arranged on the first range of the contact means for introducing said first original document through an introducing path to said fixed position and for ejecting said first original document through an ejecting path from said fixed position; and wherein the ejecting path is formed from said fixed position to an ejecting orifice; and first and second feeder means arranged in the ejecting path for feeding the first original document to said ejecting orifice, wherein the first feeder means is arranged in said automatic document feeder means and the second feeder means is arranged in said main body;

wherein the introducing path is formed from an introducing orifice to said fixed position, the introducing orifice being located at a side of the second range of the contact means.

16. The image scanner as claimed in claim 15, wherein an edge of said contact means is adjacent to said first and second feeder means.

17. The image scanner as claimed in claim 15, wherein said automatic document feeder means is openable and is rotatable with an axis of said first feeder means as a central axis.

18. The image scanner as claim 15, wherein said first feeder means is driven by a driver means including a one way clutch.

* * * * *